US010735303B2

(12) United States Patent
Matsunaga

(10) Patent No.: US 10,735,303 B2
(45) Date of Patent: Aug. 4, 2020

(54) OPTIMIZATION OF PACKET TRANSMISSION PATHS

(71) Applicant: NEC CORPORATION, Tokyo (JP)

(72) Inventor: Yasuhiko Matsunaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2 days.

(21) Appl. No.: 16/036,147

(22) Filed: Jul. 16, 2018

(65) Prior Publication Data
US 2018/0324079 A1 Nov. 8, 2018

Related U.S. Application Data

(62) Division of application No. 10/515,263, filed as application No. PCT/JP03/06340 on May 21, 2003, now Pat. No. 10,069,714.

(30) Foreign Application Priority Data

May 22, 2002 (JP) ................................ 2002-147275

(51) Int. Cl.
H04L 12/701 (2013.01)
H04L 12/721 (2013.01)
(Continued)

(52) U.S. Cl.
CPC ............. H04L 45/00 (2013.01); H04L 45/12 (2013.01); H04L 63/08 (2013.01);
(Continued)

(58) Field of Classification Search
None
See application file for complete search history.

(56) References Cited

U.S. PATENT DOCUMENTS 6,023,501 A 2/2000 Wakamatsu
6,636,491 B1 10/2003 Kari et al.
(Continued)

FOREIGN PATENT DOCUMENTS

JP 10-243440 9/1998
JP 2001-16258 1/2001
(Continued)

OTHER PUBLICATIONS

U.S. Office Action for co-pending U.S. Appl. No. 15/978,951, dated Sep. 13, 2018.
(Continued)

Primary Examiner — Jutai Kao
(74) Attorney, Agent, or Firm — Young & Thompson

(57) ABSTRACT

A method is disclosed for optimizing packet transmission paths in a mobile communication network (400) in which packets are transmitted and received between mobile stations (10-14) or between a mobile station and a fixed network (120) by way of a plurality of packet transmission device (60-64, 70-72, 80, and 81) and radio base stations (50-57). When a mobile station uses a service that is provided by a fixed network (300), imposed are applied on the packet transmission path such that packets pass by way of specific packet transmission devices (80 and 81) depending on the fixed network (external network) 300. When the mobile station uses a service that is provided by the mobile communication network (400), on the other hand, no restrictions are imposed on the packet transmission path, and the packet transmission path is thus set such that the link costs are a minimum.

12 Claims, 14 Drawing Sheets

(51) Int. Cl.
*H04L 29/06* (2006.01)
*H04W 40/02* (2009.01)
*H04W 12/00* (2009.01)
*H04L 12/715* (2013.01)
*H04W 12/06* (2009.01)
*H04W 48/18* (2009.01)

(52) U.S. Cl.
CPC ......... *H04W 12/001* (2019.01); *H04W 40/02* (2013.01); *H04L 45/04* (2013.01); *H04L 63/04* (2013.01); *H04W 12/06* (2013.01); *H04W 48/18* (2013.01)

(56) References Cited

U.S. PATENT DOCUMENTS

| | | | |
|---|---|---|---|
| 6,636,502 | B1 | 10/2003 | Lager |
| 6,940,834 | B2 | 9/2005 | Bakke et al. |
| 6,975,634 | B1 * | 12/2005 | Chow ............... H04L 12/66 370/401 |
| 6,980,537 | B1 | 12/2005 | Liu |
| 6,987,779 | B1 | 1/2006 | Sevanto et al. |
| 7,058,076 | B1 | 6/2006 | Jiang |
| 7,366,108 | B2 | 4/2008 | Szentesi et al. |
| 7,616,601 | B2 | 11/2009 | Norrgard et al. |
| 2001/0003191 | A1 | 6/2001 | Kovacs et al. |
| 2002/0057657 | A1 | 5/2002 | La Porta et al. |
| 2002/0191562 | A1 | 12/2002 | Kumaki et al. |
| 2003/0054818 | A1 | 3/2003 | Bahl et al. |
| 2003/0076814 | A1 | 4/2003 | Gurivireddy et al. |
| 2003/0112793 | A1 * | 6/2003 | Sengodan ......... H04L 12/2856 370/352 |
| 2003/0174689 | A1 * | 9/2003 | Fujino ............. H04M 15/8033 370/349 |
| 2003/0214929 | A1 | 11/2003 | Bichot |
| 2004/0013099 | A1 | 1/2004 | O'Neill |
| 2005/0111462 | A1 | 5/2005 | Walton et al. |
| 2005/0198372 | A1 | 9/2005 | Narayanan et al. |
| 2006/0062240 | A1 | 3/2006 | Meier |
| 2007/0091845 | A1 | 4/2007 | Brideglall |
| 2007/0115881 | A1 | 5/2007 | Ohkubo et al. |

FOREIGN PATENT DOCUMENTS

| | | |
|---|---|---|
| JP | 2002-185500 | 6/2002 |
| JP | 2003224589 | 8/2003 |
| WO | WO 00/76234 | 12/2000 |
| WO | WO 01/06732 | 1/2001 |
| WO | WO 01/37508 | 5/2001 |
| WO | WO 01/39525 | 5/2001 |

OTHER PUBLICATIONS

S. Ramanathan et al., "A survey of routing techniques for mobile communications networks", Mobile Networks and Applications vol. 1, No. 2, Oct. 1996, pp. 89-104, XP002361951.

A. Myles et al., "Comparing four IP based mobile host protocols", Computer Networks and ISDN Systems, [Online] 1993, XP002361952 Retrieved from the Internet: URL:citeseer.ist.psu.edu/myles93comparing.html>[retrieved on Jan. 5, 2006].

G. Racherla et al., "A distributed rerouting algorithm for mobile-mobile connections in connection-oriented networks", Computer Communications and Networks, 1998. Proceedings. 7th International Conference on Lafayette, LA, USA Oct. 12-15, 1998, Los Alamitos, CA USA, IEEE Comput.Soc., US, Oct. 12, 1998, pp. 40-44, XP010587021.

C. Perkins et al., "Route optimization in mobile IP: draft-ietf-mobileip-optim-11.txt", Internet Engineering Task Force Internet Draft, XX, XX, Sep. 6, 2001, pp. 1-25, XP002234531.

Perkins et al., "RFC 3220: IP Mobility Support for IPv4", IRTF RFC, Jan. 21, 2002, XP-002288705. pp. 1-97.

Digital cellular telecommunications systems (Phase 2+) (GSM); Universal Mobile Telecommunications System (UMTS); General Packet Radio Service (GPRS) Service description; Stage 2 (3GPP TS 23.060 version 3.11.0 Release 1999), TETSI TS 123 060, ETSI Standards, European Telecommunications Standards Institute, vol. 3-SA2, No. V31100, Mar. 2002, XP014007556. pp. 1-197.

J. Moy, "OSFP Version 2", IETF RFC, Apr. 1998, XP002234813, pp. 1-244.

D.B. Johnson et al., "Protocols for Adaptive Wireless and Mobile Networking", IEEE Personal Communications, IEEE Communications Society, vol. 3, No. 1, Feb. 1, 1996, pp. 34-42, XP000554691.

First Office Action from State Intellectual Property Office of China, dated Aug. 10, 2007.

Ramjee et al., "Performance evaluation of connection rerouting schemes for ATM-based wireless networks", IEEE/ACM Transactions on Networking, IEEE/ACM, New York, NY, vol. 6, No. 3, Jun. 1998 pp. 249-261, XP000755004.

Office Action in co-pending U.S. Appl. No. 15/978,951 dated Apr. 16, 2019.

Office Action in co-pending U.S. Appl. No. 15/978,951 dated Aug. 30, 2019.

Office Action in co-pending U.S. Appl. No. 16/036,147 dated Sep. 18, 2019.

* cited by examiner

Fig. 10

| Mobile Station Identifier E10 | Final Authentication Time E11 | Authentication Status E12 | Challenge Random Number E13 | Authentication Key E14 | Encryption Algorithm E15 | Message Encryption Key E16 | Message Alteration Detection Key E17 |
|---|---|---|---|---|---|---|---|
| a | 21:11:04 | OK | Ra | K1a | AES | K2a | K3a |
| b | 21:34:25 | OK | Rb | K1b | AES | K2b | K3b |
| c | 21:22:49 | OK | Rc | K1c | 3DES | K2c | K3c |
| ... | ... | ... | ... | ... | ... | ... | ... |

Fig. 11

| Mobile Station Identifier E20 | Service Type E21 | Connection Destination E22 | Uplink Data Transfer Amount E23 | Downlink Data Transfer Amount E24 | Connection Time E25 | Mobile Station Location Network E26 |
|---|---|---|---|---|---|---|
| a | External Network Connection | Fixed Network 1 | 564,320 | 3,468,280 | 1:24:35 | Mobile Network 1 |
| | | Fixed Network 2 | 3,790 | 69,240 | 0:18:22 | Mobile Network 3 |
| | | ... | ... | ... | ... | ... |
| | Peer‑to‑Peer Connection | Mobile Station 1 | 153,280 | 164,250 | 0:36:48 | Mobile Network 1 |
| | | Mobile Station 2 | 284,350 | 139,720 | 0:24:15 | Mobile Network 1 |
| b | ... | ... | ... | ... | ... | ... |

OPTIMIZATION OF PACKET TRANSMISSION PATHS

TECHNICAL FIELD

The present invention relates to a method of setting paths of packet communication in a mobile communication network, and more particularly to a method of optimizing packet transmission paths in a network in which a plurality of packet transmission devices and radio base stations are connected in a hierarchy.

BACKGROUND ART

Typically, a packet mobile communication network requires the unobstructed call origination from mobile stations, call termination to mobile stations, and continuation of packet communication that is in progress despite the movement of the mobile stations within the network. For this reason, information such as the positions of mobile stations and the closest radio base station is constantly managed and updated as necessary in a packet mobile communication network. When the number of mobile terminals that are managed in a portable telephone system is extremely large, the centralized management of information of each individual mobile station leads to an increase in the amount of management traffic that must be transferred inside the network, and in addition, results in considerable time expended for the switching of packet transmission paths that accompanies movement. For this reason, techniques are typically employed wherein packet transmission devices and positional management servers are normally arranged hierarchically, and the managed traffic for movement within each hierarchy is localized within the hierarchy.

In the case of a mobile communication network based on, for example, the specifications of the GPRS (General Packet Radio Service) of 3GPP (3rd Generation Partnership Project), the packet transmission device of the highest level is referred to as the GGSN (Gateway GPRS Support Node), the packet transmission device of the next level is referred to as the SGSN (Serving GPRS Support Node), the packet transmission device of the next level is referred to as the RNC (Radio Network Controller) or BSC (Base Station Controller), and the radio base stations are arranged at the lowest level. The packet communication scheme in the GPRS is described in detail in the technical specification 3GPP TS 23.060, "General Packet Radio Service (GPRS); Service Description; Stage 2."

In GPRS, when mobile stations are normally connected to an outside service provider, packet communication is performed, the following procedures are taken:

1. The mobile station selects the radio base station for which communication conditions are best and establishes a data link.
2. The mobile station establishes a data link to the RNC/BSC to which the radio base station belongs.
3. The mobile station establishes a data link to the SGSN to which the RNC/BSC belongs.
4. The mobile station reports to the SGSN the name of the service provider to which it is requesting connection. This name is referred to as the APN (Access Point Name).
5. The SGSN selects the appropriate GGSN in accordance with the reported APN and the subscriber information of the mobile station, and establishes a data link between the SGSN and the GGSN.
6. The mobile station begins to communicate packets with the outside service provider by way of the radio base station, the RNC/BSC, the SGSN, and the GGSN that have been determined in this way.
7. When the mobile station moves during communication, communication is continued by appropriately reselecting the connecting radio base station, RNC/BSC, and SGSN.
8. When communication is completed, the mobile station releases each of the data links.

In this way, when a mobile station connects to a service provider outside the mobile communication network in GPRS, and performes packet communication, the packet transmission path within the mobile communication network is substantially optimized. This is because the node to an outside service provider is fixed in the GGSN that is at the apex of the hierarchy of packet transmission devices. A similar type of hierarchical architecture is also employed in packet mobile communication systems other than GPRS.

However, constraints that force the transmission path to pass by way of the apex of the hierarchy of packet transmission devices when the communication partner of a mobile station is within the same mobile communication network results in the problem of redundancy in the packet transmission path. For example, in a packet communication services such as voice communication or instant messaging, the bulk of traffic is between mobile stations that are at relatively close positions within the same mobile communication network. Even though the packet transmission path is optimized if packets are returned at packet transmission devices that are at a low level in the hierarchy at this time, when the packet transmission path is restricted such that the packets pass by way of the packet transmission device that belongs to the highest-ranked level, network resources are needlessly consumed. In some services that are used by the mobile station, moreover, failure to route packets by way of a specific packet transmission devices may cause problems relating to levying charges i.e., optimization of packet transmission paths cannot always be achieved.

Disclosure of Invention

It is an object of the present invention to provide a packet transmission path optimization method that relates to packet data communication in a mobile communication network for optimizing the packet transmission path of packets according to the service that is used by a mobile station and according to the communication partner of the mobile station.

In the first packet transmission path optimization method according to the present invention, in a mobile communication network for transmitting and receiving packets between a mobile station and another mobile station or fixed station by way of a plurality of packet transmission devices and radio base stations, a packet transmission path is selected either by imposing restrictions on the packet transmission path such that packets pass by way of one or more specific packet transmission devices according to the type of service (such as an external network connection or Peer-to-Peer connection) that is used by the mobile station, or by not imposing restrictions on the packet transmission path such that the sum of link costs is minimized.

In the second packet transmission path optimization method according to the present invention, in a mobile communication network for transmitting and receiving packets between a mobile station and another mobile station or a fixed station by way of a plurality of packet transmission devices and radio base stations, the packet transmission path is optimized either by imposing restrictions on the packet transmission path such that packets pass by way of one or more specific packet transmission devices when the mobile station uses a service (such as a mail service, a Web browsing service, or a service for downloading music/movie files) that is provided by an external network, or by not imposing restrictions on the packet transmission path such that the sum of link costs is minimized when the mobile station uses a service (such as a voice telephone service, video telephone service, short message, or chat service) that is provided by the mobile communication network to which the mobile station is directly connected.

In the third packet transmission path optimization method according to the present invention, when the radio base stations or packet transmission devices to which a mobile station is connected change due to movement of the mobile station in the first or second packet transmission path optimization method, if there is a plurality of specific packet transmission devices through which packets are to pass, and if the sum of link costs is less for a packet transmission path that passes by way of specific packet transmission devices other than the specific packet transmission devices that were selected before movement, restrictions are imposed on the packet transmission path by again selecting the other specific packet transmission devices.

In the fourth packet transmission path optimization method according to the present invention, in a mobile communication network for transmitting and receiving packets between a mobile station and another mobile station or a fixed station by way of a plurality of packet transmission devices and radio base stations that are connected hierarchically after a packet transmission device has designated in advance a portion or all of the packet transmission path, wherein a packet transmission device, when designating the packet transmission path, selects either a route that passes by way of packet transmission devices that belong to a higher-ranked level than its own level or a route that passes by way of only packet transmission devices that belong to lower-ranked levels than its own level such that the sum of link costs is lower and then establishes the packet transmission path.

In the fifth packet transmission path optimization method according to the present invention, in a mobile communication network for transmitting and receiving packets between a mobile station and another mobile station or a host that is connected to an external network by way of a plurality of packet transmission devices and radio base stations that are connected hierarchically after a portion or all of the packet transmission path has designated in advance, when a packet transmission device that belongs to a higher-ranked level detects after the packet transmission path has been established that a packet transmission path having a lower sum of link costs can be established in a lower-ranked level than its own, the packet transmission device of the higher-ranked level instructs switching of the packet transmission path from packet transmission devices of the higher-ranked level to packet transmission devices of the lower-ranked level such that a packet transmission path is established between packet transmission devices of the lower-ranked level.

According to the sixth packet transmission path optimization method according to the present invention, when a packet transmission device of a higher-ranked level instructs switching of a packet transmission path to packet transmission devices of a lower-ranked level in the fifth packet transmission path optimization method, the packet transmission device of the higher-ranked level transfers communication contexts that is possesses such as charge information or authentication information for mobile stations to the packet transmission device of the lower-ranked level.

According to the seventh packet transmission path optimization method according to the present invention, in a mobile communication network for transmitting and receiving packets between a mobile station and another mobile station or a host that is connected to an external network by way of a plurality of packet transmission devices and radio base stations that are hierarchically connected after a portion or all of the packet transmission path has been designated in advance, when the radio base stations or packet transmission devices to which a mobile station is connected change due to movement of the mobile station after the packet transmission path has been established, a packet transmission device of a higher-ranked level determines whether the packet transmission path can be changed to a packet transmission path that passes by way of packet transmission devices of a more highly-ranked level, and if a packet transmission path having lower costs can be established by way of packet transmission devices of the more highly-ranked level, the packet transmission device of the higher-ranked level instructs switching of the packet transmission path to the packet transmission devices of the more highly-ranked level.

According to the eighth packet transmission path optimization method according to the present invention, when the packet transmission device of a higher-ranked level instructs switching of the packet transmission path to the packet transmission devices of a more highly-ranked level in the seventh packet transmission path optimization method, the packet transmission device of the higher-ranked level transfers communication contexts that it possesses such as charge information and authentication information for mobile stations to the packet transmission device of the more highly-ranked level.

According to the ninth packet transmission path optimization method according to the present invention, the mobile communication network in the first to eighth packet transmission path optimization methods is a GPRS (General Packet Radio Service) network based on the TS 23.060 standards of the 3GPP (Third Generation Partnership Project), the packet transmission devices of the highest-ranked level are GGSN (Gateway GPRS Support Nodes), the packet transmission devices of the next level are SGSN (Serving GPRS Support Nodes), the packet transmission devices of the next level are BSC (Base Station Controllers) or RNC (Radio Network Controllers), radio base stations are arranged at the lowest-ranked level, and routers are arranged as necessary between the radio base stations and the packet devices of each level.

According to the tenth packet transmission path optimization method according to the present invention, the mobile communication network in the first to eighth packet transmission path optimization methods according to the present invention is a network based on the RFC (Request for Comments) 3220 Standards of the IETF (Internet Engineering Task Force), the packet transmission devices of the highest-ranked level are HA (Home Agents), radio base stations are arranged on the lowest-ranked level, and routers, which are the packet transmission devices of the intermediate levels, are arranged between the HA and the radio base stations.

According to the eleventh packet transmission path optimization method according to the present invention, when packets are transmitted from a communication partner of a mobile station to the mobile station in the tenth packet transmission path optimization method, the packet transmission path is selected by implementing tunneling and reverse tunneling such that a HA is included in the packet transmission path according to the type of service that the mobile station uses or by not imposing restrictions on the packet transmission path such that the sum of link costs is minimized The first packet transmission device according to the present invention includes: means for identifying the type of service that the mobile station is to use based on information that is included in a request to establish a path that has been transmitted by the mobile station; and means for optimizing the packet transmission path either by imposing restrictions on the packet transmission path such that the route passes by way of one or more specific packet transmission devices depending on the type of service that has been identified or by not imposing restrictions on the packet transmission path such that the sum of link costs is minimized.

The second packet transmission device according to the present invention includes: means for identifying, based on information that is included in the request to establish a path that has been transmitted by a mobile station, whether the mobile station is to use a service that is provided by an external network or the mobile station is to use a service that is provided by the mobile communication network to which the mobile station is directly connected; and means for setting the packet transmission path either by imposing restrictions on the packet transmission path such that the packet transmission path passes by way of one or more specific packet transmission devices when the mobile station is to use a service that is provided by an external network, or by not imposing restrictions on the packet transmission path such that the sum of link costs is minimized when the mobile station is to use a service that is provided by the mobile communication network to which the mobile station is directly connected.

The third packet transmission device according to the present invention includes means for, when the radio base stations or packet transmission devices to which the mobile station is connected change due to movement by the mobile station in the first or second packet transmission device, if there are a plurality of specific packet transmission devices through which packets are to pass, and if a packet transmission path that passes by way of specific packet transmission devices other than the specific packet transmission devices that were selected before the movement has a lower sum of link costs, imposing restrictions on the packet transmission path by reselecting the other specific packet transmission devices.

The fourth packet transmission device according to the present invention includes: means for, when a portion or all of a packet transmission path has been designated in advance, selecting either a packet transmission path that passes by way of packet transmission devices that belong to a level that is more highly ranked than its own or a packet transmission path that passes by way of only packet transmission devices that belong to levels that are ranked equal to or lower than its own depending on which path has the lower sum of link costs; and means for establishing the selected packet transmission path.

The fifth packet transmission device according to the present invention includes: means for, after a packet transmission path has once been established, detecting whether a packet transmission path having lower link costs can be established between packet transmission devices of a lower-ranked level; and means for instructing packet transmission devices of a lower-ranked level to switch the packet transmission path such that a packet transmission path is established between packet transmission devices of the lower-ranked level.

The sixth packet transmission device according to the present invention includes means for, when instructing switching of the packet transmission path in the fifth packet transmission device, transmitting communication contexts such as charge information and authentication information for mobile stations to the packet transmission device of a lower-ranked level.

The seventh packet transmission device according to the present invention includes: means for, when the radio base stations or packet transmission devices to which a mobile station is connected change due to movement of the mobile station after a packet transmission path has once been established, determining whether the packet transmission path can be changed to pass by way of packet transmission devices of a level that is more highly-ranked than its own; and means for instructing the packet transmission devices of the more highly-ranked level to switch the packet transmission path when it has been determined that a packet transmission path can be established that passes by way of the packet transmission devices of the more highly-ranked level and that has a lower sum of link costs.

The eighth packet transmission device according to the present invention includes in the seventh packet transmission device means for, when instructing switching of the packet transmission path, transferring communication contexts such as charge information or authentication information for mobile stations to the packet transmission device of the more highly-ranked level.

According to the present invention, when a request to establish a path or a request to alter a path is received from a mobile station, the type of service that is used by the mobile station is first identified, following which, depending on the type of service that has been identified or the network that provides the service, the packet transmission path is optimized by imposing restrictions such that the packet transmission path passes by way of one or more specific packet transmission devices, or by not imposing restrictions on the packet transmission path such that the sum of link costs is minimized. In this way, the arrangement of route restrictions can be maintained in accordance with services while raising the efficiency of utilization of network resources.

In addition, when altering a packet transmission path that has once been established, the transfer of communication contexts such as the authentication/charge information between the packet transmission devices of different levels allows an acceleration of the reestablishment of the packet transmission path.

BRIEF DESCRIPTION OF THE DRAWINGS

FIG. 10 shows the configuration of a mobile station user authentication information table that is held by a second-level packet transmission device in the second embodiment;

FIG. 11 shows the configuration of a mobile station user charge information table that is held by a second-level packet transmission device in the second embodiment;

BEST MODE FOR CARRYING OUT THE INVENTION

Figure 1:
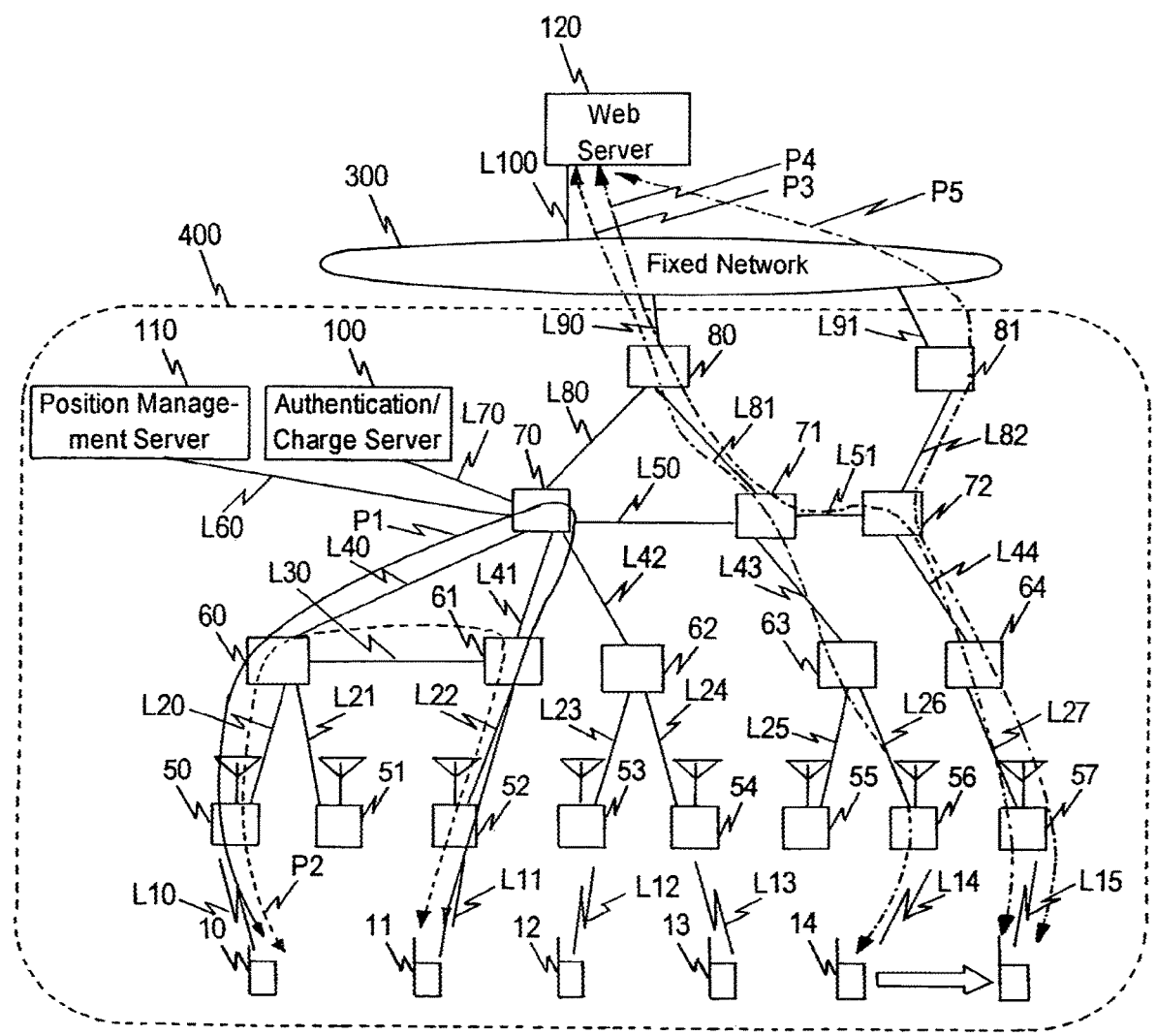
FIG. 1 shows an example of the configuration of a mobile communication network in which to the present invention has been applied.

FIG. 1 shows an example of the configuration of a mobile communication network to which the present invention has been applied. This mobile communication network includes mobile communication network 400, fixed network 300, and Web server 120. Mobile communication network 400 includes: mobile stations 10-14, radio base station 50-57, first-level packet transmission devices 80 and 81, second-level packet transmission devices 70-72, third-level packet transmission devices 60-64, position management server 110, and authentication/charge server 100. Mobile stations 10-14 are connected to radio base stations 50-57 by way of links L10-L15, respectively. Radio base stations 50-57 and third-level packet transmission devices 60-64 are connected by way of links L20-L27. Third-level packet transmission devices 60-64 and second-level packet transmission devices 70-72 are connected by way of links L40-L44. Second-level packet transmission devices 70-72 and first-level packet transmission devices 80-81 are connected by way of links L80-L82. In addition, second-level packet transmission devices 70 and 71 are connected by way of link L50, and second-level packet transmission devices 71 and 72 are connected by way of link L51. Third-level packet transmission devices 60 and 61 are connected to each other by way of link L30. Further, position management server 110 and authentication/charge server 100 are connected to second-level packet transmission device 70 by way of links L60 and L70, respectively. In addition, routers (not shown) may be arranged as necessary between packet transmission devices 80, 81, 70-72, and 60-64 and radio base stations 50-57 of each of the levels.

When mobile communication network 400 is, for example, a GPRS network based on the standards of TS 23.060 of 3GPP, packet transmission devices 80 and 81 of the highest (first) level are GGSN, packet transmission devices 70-72 of the next (second) level are SGSN, packet transmission devices 60-64 of the next (third) level are BSC or RNC, and radio base stations 50-57 are the lowest level. Alternatively, when mobile communication network 400 is a network based on the standards of RFC 3220 of IETF, packet transmission devices 80 and 81 of the highest (first) level are HA (Home Agents), radio base stations 50-57 are arranged on the lowest level, and routers composed of packet transmission devices 60-64 and 70-72 of the intermediate levels are arranged between HA and the radio base stations.

The packet transmission devices are divided between three levels in order to allow hierarchical management of the positions of mobile stations 50-57 and hierarchical control of packet paths during movement. This approach is widely employed in mobile communication networks. Although three levels are shown in FIG. 1, the number of levels may be varied according to the scale of the mobile communication network or according to the operating requirement of the network. In addition, as previously described, position management server 110 may also be arranged hierarchically, but since this component is not directly related to the present invention, only one position management server is arranged for the sake of simplificity in FIG. 1.

Mobile communication network 400 having the above-described configuration is connected to a fixed network 1 (300), which is an external network, by way of links L90 and L91 through first-level packet transmission devices 80 and 81, respectively. A plurality of links need not be provided for connection to fixed network 300, one link being adequate as a minimum. Although only one external network is connected in FIG. 1, a plurality of external networks may be connected. In this case, the correlation between first-level packet transmission devices 80 and 81 and the external network is uniquely defined in the system. Mobile stations 50-57 obtain information by means of server/client communication from a dedicated server such as Web server 120 that is connected to fixed network 300. Alternatively, mobile stations 50-57 can also make direct peer-to-peer connections with other mobile stations to directly exchange information. Reference numerals P1 and P2 in FIG. 1 indicate examples of packet transmission paths that are set according to the present invention when mobile stations make direct peer-to-peer connections, and reference numerals P3-P5 indicate examples of packet transmission paths that have been set according to the present invention when mobile stations communicate with Web server 120.

First Embodiment

Figure 2:
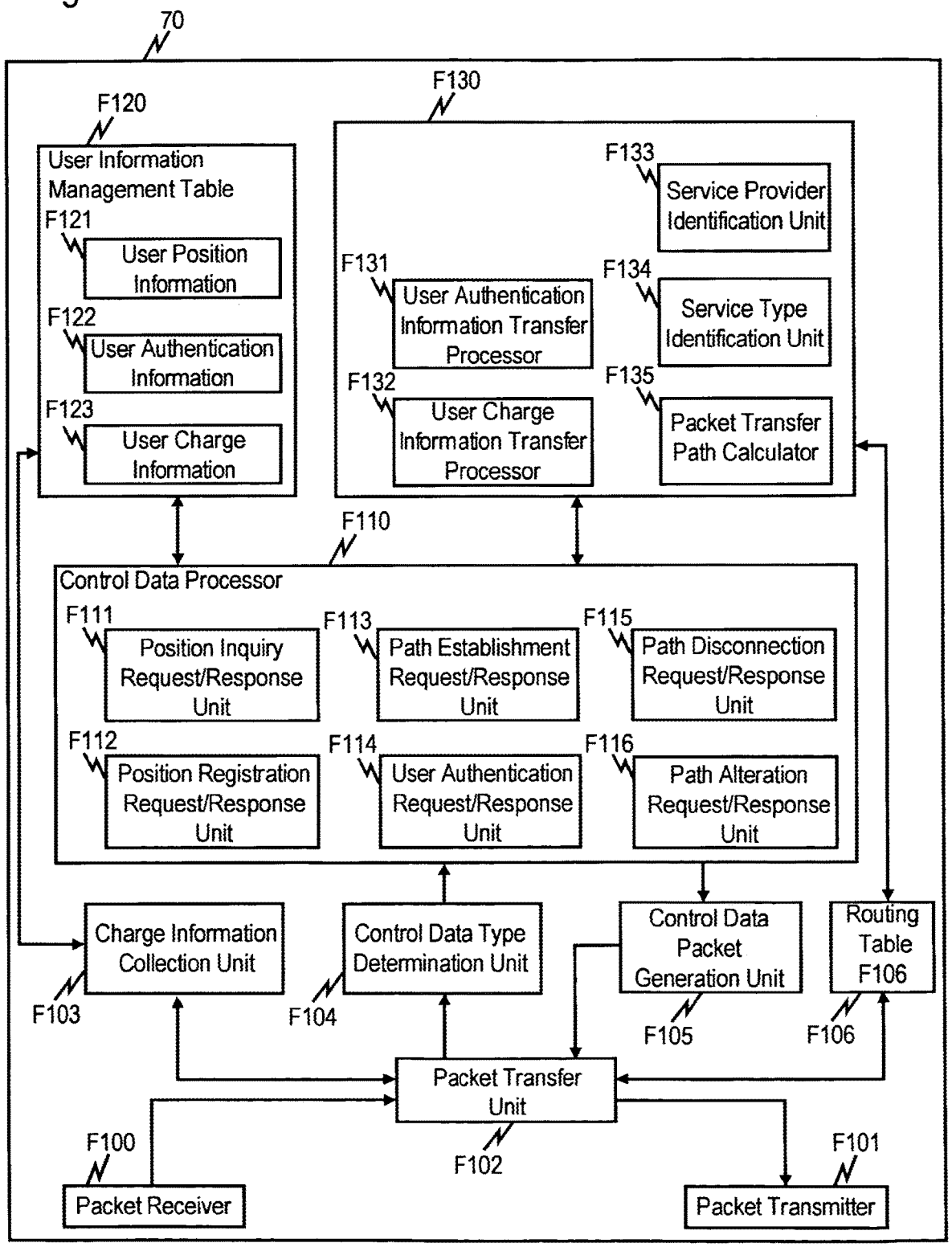
FIG. 2 is a diagram of a second-level packet transmission device in the first embodiment of the present invention.

FIG. 2 shows an example of the configuration of second-level packet transmission device 70. Packet transmission device 70 includes: packet receiver F100, packet transmitter F101, packet transfer unit F102, charge information collection unit F103, control data type determination unit F104, control data packet generation unit F105, routing table F106, control data processor F110, user information management table F120, and control subroutine group F130. Upon receiving packets from the outside, packet receiver F100 performs a lower-layer termination process on the packets and then supplies the packets to packet transfer unit F102. Packet transfer unit F102, upon receiving packet from packet receiver F100 or control data packet generation unit F105, consults routing table F106 to determine the next-hop node of the packet, and if the packet is not addressed to its own node, supplies the packet as output to the outside from packet transmitter F101. Packet transfer unit F102, upon detecting a control packet that is addressed to its own node, supplies the packet to control data type determination unit F104. Packet transfer unit F102 also measures the connection time and the amount of packets that are transferred for each mobile station by the method that is designated by charge information collection unit F103 and supplies the results to charge information collection unit F103. Upon receiving a control packet, control data type determination unit F104 determines the type of control data and supplies the result to control data processor F110.

According to the control data type, control data processor F110 comprises the sub-blocks: position inquiry request/response unit F111, position registration request/response unit F112, path establishment request/response unit F113, user authentication request/response unit F114, path disconnection request/response unit F115, and path alteration request/response unit F116. User information that is obtained by the transmission and reception of control data is stored in user information management table F120. User information management table F120 contains user position information F121, user authentication information F122, and user charge information F123. In addition, some of the internal processing of control data processor F110 is implemented by invoking various functions that are contained in control subroutine groups F130. User authentication information transfer processor F131 that is contained in control subroutine group F130 carries out processing when exchanging user authentication information with other packet transmission devices. User charge information transfer processor F132 performs processing when exchanging user charge information with other packet transmission devices. Service type identification unit F134 performs processing to determine the type of service when receiving path establishment/alteration request messages. Service provider identification unit F133 performs processing to identify the internal or outside business that provides a service when receiving a path establishment/alteration request message. Packet transfer path calculator F135 performs processing to calculate the optimum packet transmission path according to the type of service and the service provider and to set this packet transmission path in routing table F106. Other packet transmission devices 71 and 72 in the second level also have the same configuration as packet transmission device 70 that is shown in FIG. 2.

Figure 3:
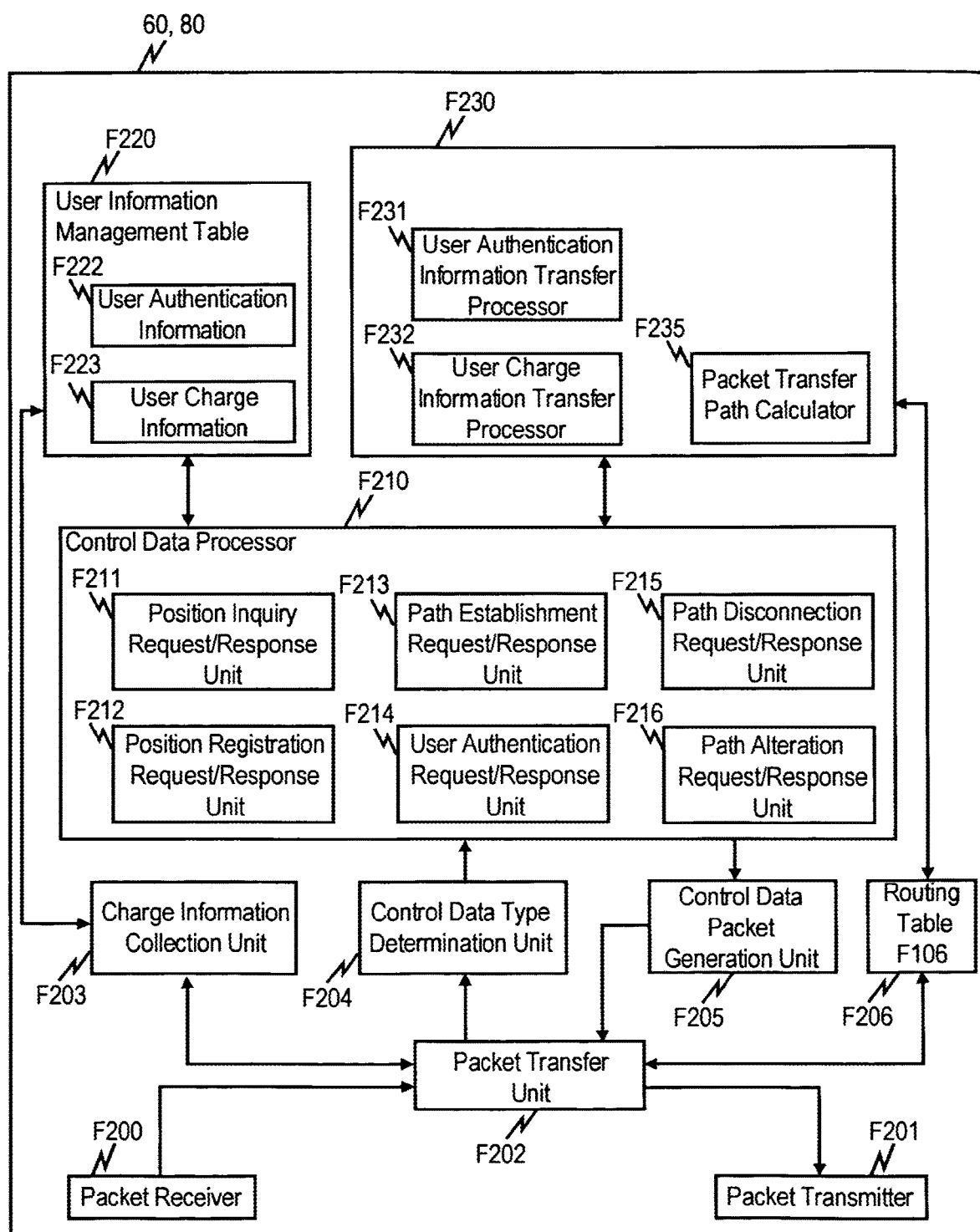
FIG. 3 is a diagram showing the configurations of a first-level packet transmission device and a third-level packet transmission device in the first embodiment.

FIG. 3 shows an example of the configuration of third-level packet transmission device 60 and first-level packet transmission device 80. Third-level packet transmission device 60 or first-level packet transmission device 80 has the configuration of second-level packet transmission device 70 that is shown in FIG. 2 with user position information F121, service provider identification unit F133, and service type identification unit F134 eliminated. The other third-level packet transmission devices 61-64 and the other first-level packet transmission device 81 also have the same configuration as packet transmission devices 60 and 80 that are shown in FIG. 3.

The operation of the mobile communication network of FIG. 1 will be explained below.

Figure 4:
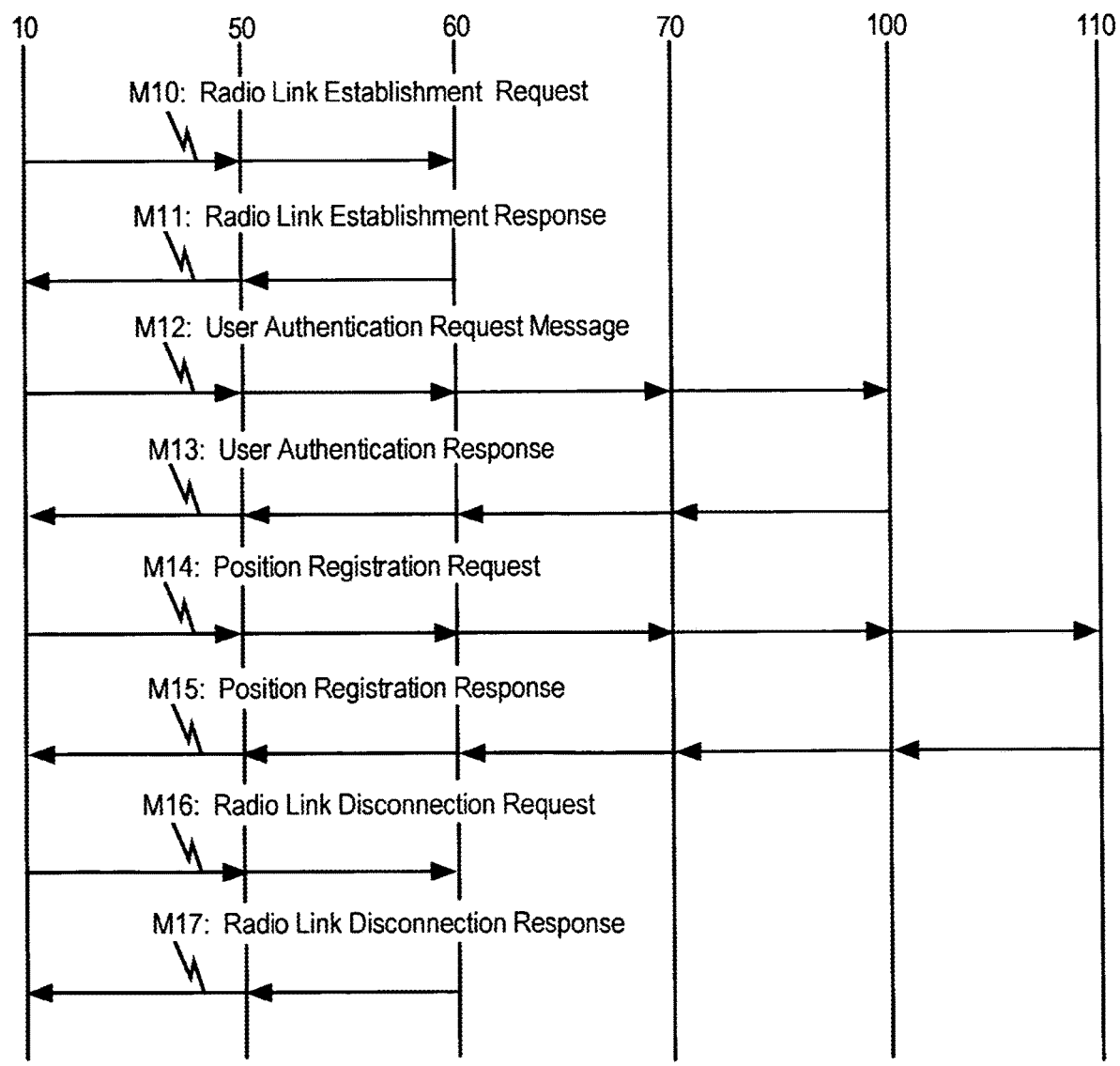
FIG. 4 is a sequence chart of the initial authentication and position registration of a mobile station in the first embodiment.

Explanation first regards processing for authentication and position registration at the time of activating a mobile station taking mobile station 10 as an example. FIG. 4 shows the sequence of messages for authentication and position registration at the time of activating mobile station 10. Mobile station 10 first searches for a radio base station in the vicinity, transmits to radio base station 50 radio link establishment request M10, receives from radio base station 50 radio link establishment response M11, and then establishes a radio link. Mobile station 10 next transmits user authentication request message M12 to authentication/charge server 100, receives user authentication response M13 from authentication/charge server 100, and then exchanges the series of messages that are required for user authentication. If user authentication is successful, mobile station 10 next transmits position registration request M14 to position management server 110, receives position registration response M15 from position management server 110, and registers its own position. This position registration information is used for controlling the path when a call is terminated to mobile station 10 from external network 300 or within mobile communication network 400. Upon completing the position registration, mobile station 10 transmits radio link disconnection request M16 to radio base station 50, receives radio link disconnection response M17 from radio base station 50, and thus cuts the radio link and enters a power-saving mode.

Figure 5:
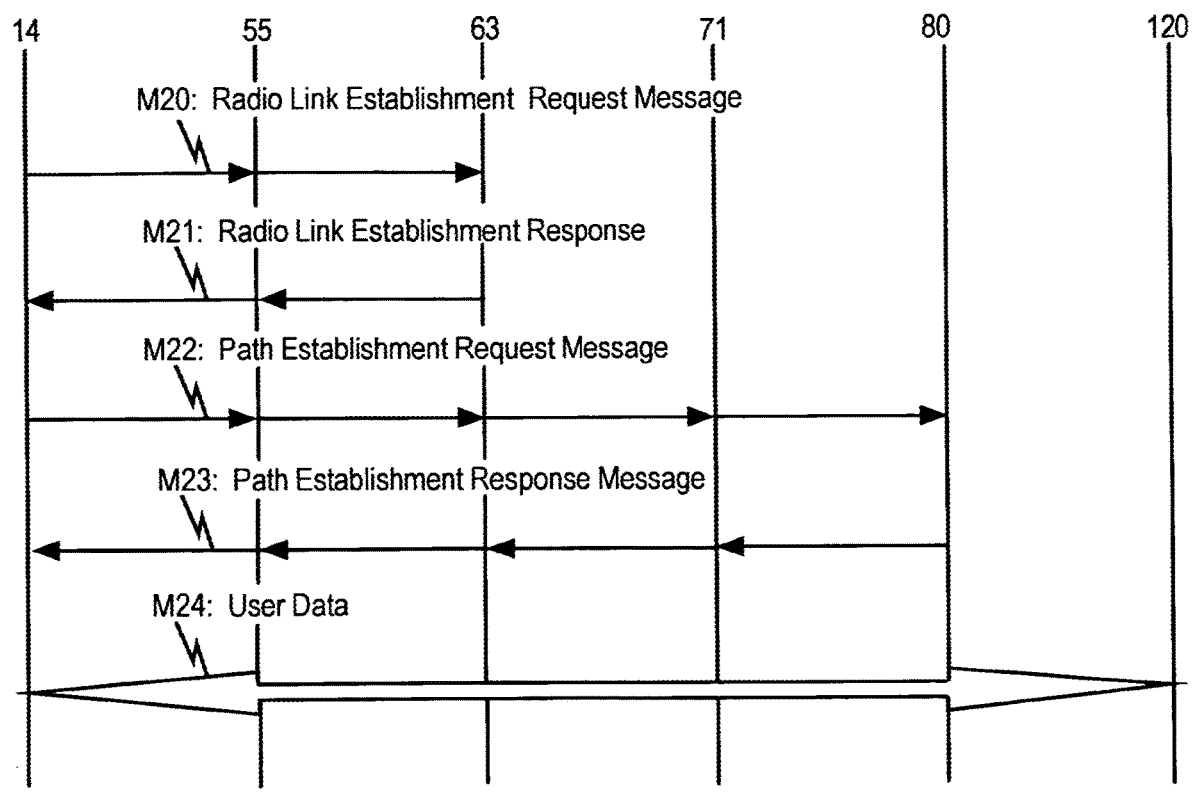
FIG. 5 is a chart of the sequence when a mobile station connects to a fixed network and establishes a packet transmission path in the first embodiment.

Explanation next regards processing when a mobile station has connected to an external network and started packet communication, taking mobile station 14 as an example. FIG. 5 shows the sequence of messages up to the time that mobile station 14 connects to the external network and begins packet communication. Mobile station 14 first transmits radio link establishment request message M20 to radio base station 56, receives a radio link establishment response from radio base station 56, and establishes a radio link between radio base station 56 and third-level packet transmission device 63. Mobile station 14 next transmits path establishment request message M22 on the radio link that has been established. If the mobile communication network is based on GPRS that is stipulated by 3GPP TS 23.060, path establishment request message M22 is equivalent to a PDP Context Activation message that a mobile station transmits to a SGSN. Alternatively, if the mobile communication network is based on Mobile IP that is stipulated by RFC 3220 of IETF, path establishment request message M22 is equivalent to a Registration Request message that is transmitted from a mobile station to a home agent. The mobile communication network may also be based on an architecture other than the two described hereinabove. In path establishment request message M22, information is included that shows that the connection destination is fixed network 300 (1), and that the requested service is an external network connection. Path establishment request message M22 is transferred to first-level packet transmission device 80 by way of radio base station 56, third-level packet transmission device 63, and second-level packet transmission device 71. First-level packet transmission device 80 responds to this message with path establishment response message M23, and when this message is transferred to mobile station 14, packet transmission path P3 is established between mobile station 14 and first-level packet transmission device 80. Mobile station 14 subsequently uses this packet transmission path P3 and performs transfer of user data M24 with Web server 120 that is connected to fixed network 300. If mobile communication network 400 is a network that is based on the standards of RFC 3220 of the IETF, packet transmission device 80 is a HA, and tunneling and reverse tunneling are implemented when packets are transmitted from the communication partner of the mobile station to the mobile station.

Figure 6:
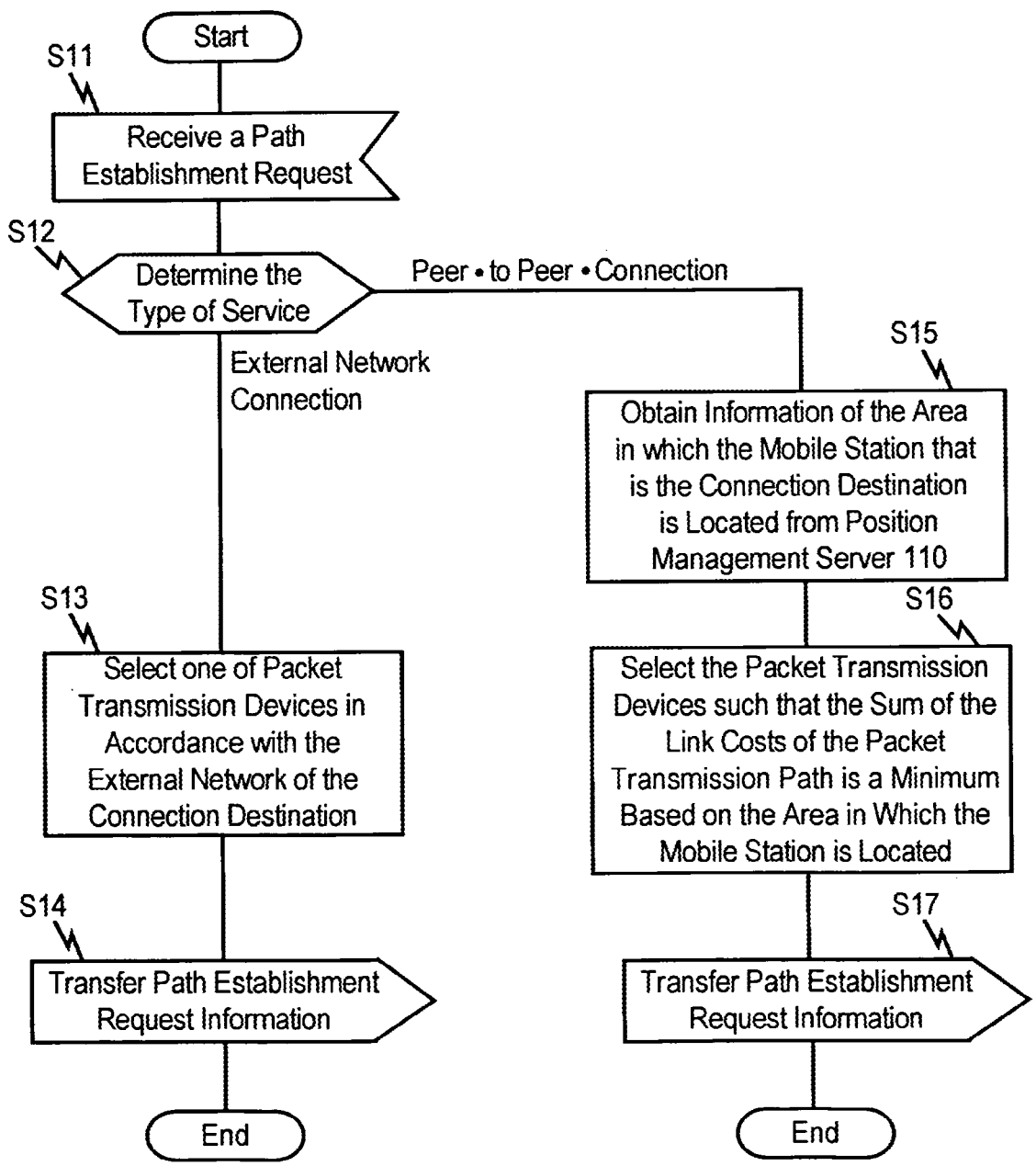
FIG. 6 is a flow chart showing the operations when a second-level packet transmission device establishes a packet transmission path in the first embodiment.

FIG. 6 is a flow chart showing the operations when second-level packet transmission devices 70, 71, and 72 establish packet transmission paths. The following explanation regards the operations when a second-level packet transmission device establishes a packet transmission path, taking packet transmission device 71 as an example.

Second-level packet transmission device 71, upon receiving a path establishment request message from lower-level packet transmission device 63 in Step S11, determines the type of service that is requested in Step S12. When the requested service is an external network connection, one of packet transmission devices 80 and 81 is selected in accordance with the external network of the connection destination in Step S13. In the case of the sequence that is shown in FIG. 5, the connection destination is fixed network 300, and packet transmission device 80 therefore has lower link costs from the standpoint of packet transmission device 71. As a result, packet transmission device 80 is selected and path establishment request information is transferred in Step S14, whereby the process is completed.

If the requested service is a peer-to-peer connection, on the other hand, packet transmission device 71 obtains information of the area in which the mobile station that is the connection destination is located from position management server 110 in Step S15. The geographical range that this area information covers is determined according to the circumstances of the operator of the mobile communication network, and this range may be in units of radio base stations or of second- and third-level packet transmission devices, or logical area information that is distinct from physical nodes may also be defined. Based on the acquired information of the area in which the mobile station is located, packet transmission device 71 next selects in Step S16 the packet transmission devices such that the packet transmission path passes by way of packet transmission device 71 and such that the sum of the link costs of the packet transmission path is a minimum. The link costs are each set in advance by, for example, the link bandwidth and the line use charges that are generated with use of links. When the "Next Hop" packet transmission device that is to be included in the packet transmission path is selected, a path establishment request message is transferred to the selected packet transmission device in Step S17 and the process thus completed.

Regarding the distribution between packet transmission devices of cost information for links that are not directly connected and the collection of information relating to the peripheral network configuration and the possibility of arrival of packet transmission paths, this information may be statically set in advance in packet transmission devices, or an already-existing routing protocol may be used. For example, according to Open Shortest Path Find (OSPF), Version 2 that is stipulated by RFC 2328 of the IETF, a method is shown in which link cost information is exchanged between packet transmission devices, and the Dijkstra algorithm is used to calculate the minimum-cost path between any packet transmission devices. The link costs are basically values that are statically determined by the business according to the bandwidth of each link, but may also change dynamically according to the link load or the number of mobile stations that are under the jurisdiction of the link that is managed by the position management server of the mobile communication network.

In addition, a conventional mobile communication network protocol maybe employed as the method of selecting the packet transmission devices through which the packet transmission path is to pass based on the name or address of the external network that is to be connected when establishing a packet transmission path. For example, a method is shown in Appendix A ("APN and GGSN Selection") of 3GPP TS 23.060 in which the GGSN though which the packet transmission path passes are selected in the SGSN based on the name and address of the external network that is to be connected. Items that are reported from a mobile station to a packet transmission device such as a SGSN when establishing a packet transmission path in the present invention include the type of service and information of the network that provides service, in addition to the name and address of the external network that is to be connected that are reported in the prior art. These items correspond to the information that is transmitted in message M22 in FIG. 5 and in messages M32 and M35 in FIG. 7 that will be explained hereinbelow.

Figure 7:
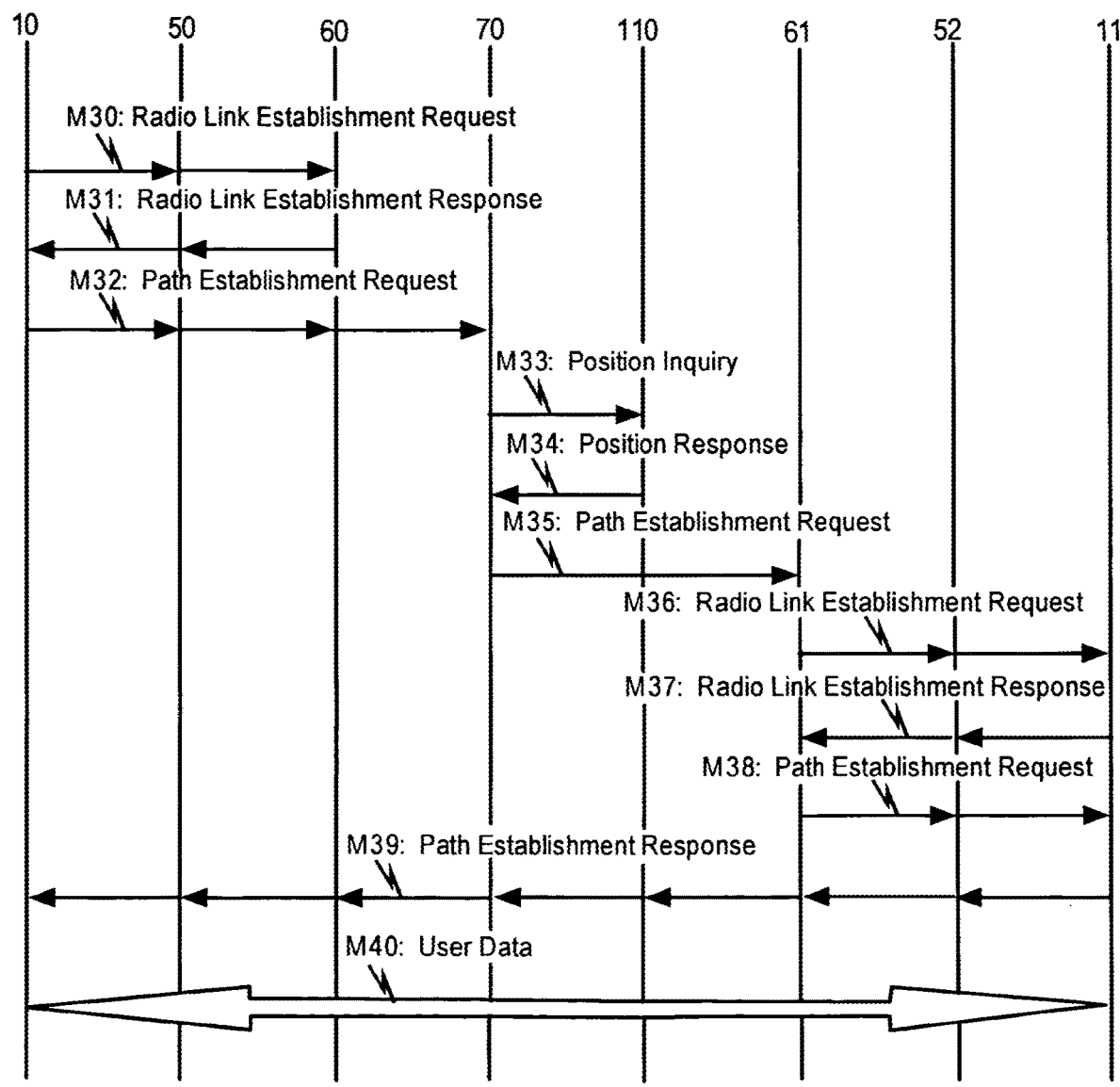
FIG. 7 is a chart of the sequence when a mobile station connects with a mobile station and establishes a packet transmission path in the first embodiment.

Explanation next regards the message sequence when establishing a packet transmission path between a mobile station and a mobile station using the establishment of a packet transmission path between mobile stations 10 and 11 as an example. FIG. 7 shows the message sequence when mobile station 10 connects to mobile station 11 and establishes a packet transmission path. Mobile station 10 transmits radio link establishment request message M30 to radio base station 50, receives radio link establishment response M31 from radio base station 50, and establishes a radio link between radio base station 50 and third-level packet transmission device 60. Mobile station 10 next transmits path establishment request message M32 on the established radio link. Path establishment request message M32 contains information indicating that mobile station 11 is the connection destination and that the requested service is a peer-to-peer connection. Path establishment request message M32 is transferred by way of radio base station 50 and third-level packet transmission device 60 to second-level packet transmission device 70.

Second-level packet transmission device 70, upon seeing the content of path establishment request message M32 that has been received and learning that the requested service is a peer-to-peer connection and that the connection destination is mobile station 11, sends position inquiry message M33 to position management server 110 to ask for information of the area in which mobile station 11 is located. When response message M34 to this position inquiry is returned from position management server 110 in response to this message, packet transmission device 70 learns that third-level packet transmission device 61 should be made the "Next Hop" to decrease the sum of the link costs of the packet transmission path and therefore transmits path establishment request message M35 to third-level packet transmission device 61. Path establishment request message M35 contains information that indicates that the connection destination is mobile station 11 and that the requested service is a peer-to-peer connection.

Third-level packet transmission device 61, upon receiving path establishment request message M35 from second-level packet transmission device 70, transmits radio link establishment request M36 to mobile station 11, and after receiving radio link establishment response M37 from mobile station 11 and establishing a radio link with mobile station 11, transmits path establishment request message M38 to mobile station 11. Path establishment request message M38 contains information indicating that the connection destination is mobile station 11 and that the requested service is a peer-to-peer connection.

Mobile station 11 on the termination side returns path establishment response message M39 in response to path establishment request message M38, and the packet transmission path is established at the time this message arrives at mobile station 10 on the origination side. The packet transmission path that is established at this time is P1.

Mobile station 10 and mobile station 11 transfer user data M40 on packet transmission path P1 that has been established in this way.

In contrast to this packet transmission path P1, the packet transmission path that is set according to the prior art must pass by way of the apex of the levels of the packet transmission devices, meaning that a redundant packet transmission path is set that passes from mobile station 10 to radio base station 50, to third-level packet transmission device 60, to second-level packet transmission device 70, to first-level packet transmission device 80, to second-level packet transmission device 70, to third-level packet transmission device 61, to radio base station 52, and finally to mobile station 11.

Thus, in the present embodiment, a packet transmission path is selected by either imposing restrictions on the packet transmission path such that the path must pass by way of a particular packet transmission device according to the service or the position of the communication partner of the mobile station, or without imposing restrictions on the packet transmission path such that the sum of the link costs is minimized. In other words, when a mobile station uses a service that is provided by an external network, the selection of packet transmission devices depending on the external network that is the connection destination in Step S13 of FIG. 6 imposes restrictions on the packet transmission path such that the route will necessarily pass by way of particular packet transmission devices such as first-level packet transmission device 80 in the example of FIG. 5. On the other hand, when a mobile station uses a service that is provided by the mobile communication network to which the mobile station is directly connected, the packet transmission path is selected without imposing restrictions on the packet transmission path such that the sum of link costs is a minimum in Step S16 in FIG. 6. As a result, the present embodiment not only maintains an arrangement of path restrictions that accord with the service but can also maximize the efficiency of utilization of network resources. This point is next explained in greater detail.

As an example, a case is considered in which an external network connection service is used for connecting to an outside fixed network by way of a first-level packet transmission device. The outside fixed network is an Internet service provider (ISP) or a business network. In addition, it is assumed that a particular fixed network "a" is connected to a packet communication network through first-level packet transmission device A, and another fixed network "b" is connected to a packet communication network through first-level packet transmission device B. When selecting the packet transmission path having the minimum link costs, restrictions typically cannot be applied on the packet transmission path such that the route passes by way of specific packet transmission paths. Thus, when the mobile station of a subscriber of a fixed network "a" uses an external network connection service, setting a path via packet transmission device B because this path has the minimum link cost may cause the mobile station to establish communication with a server that is on the Internet by way of fixed network "b," with which the subscriber has no contract. This situation is not agreeable to fixed network "b," which is the non-contracted Internet service provider. The present embodiment, however, provides a solution to this type of problem because the correlations between first-level packet transmission devices A and B and external networks "a" and "b" are uniquely defined, and when a mobile station uses an external network connection service, restrictions are applied on the packet transmission path such that the route must pass by way of a specific first-level packet transmission device. On the other hand, in the case of a connection between mobile stations within the same packet communication network, the packet transmission path is set such that the sum of link costs is minimized without imposing restrictions on the packet transmission path, whereby the efficiency of utilization of the network link resources can be increased.

Second Embodiment

Figure 8:
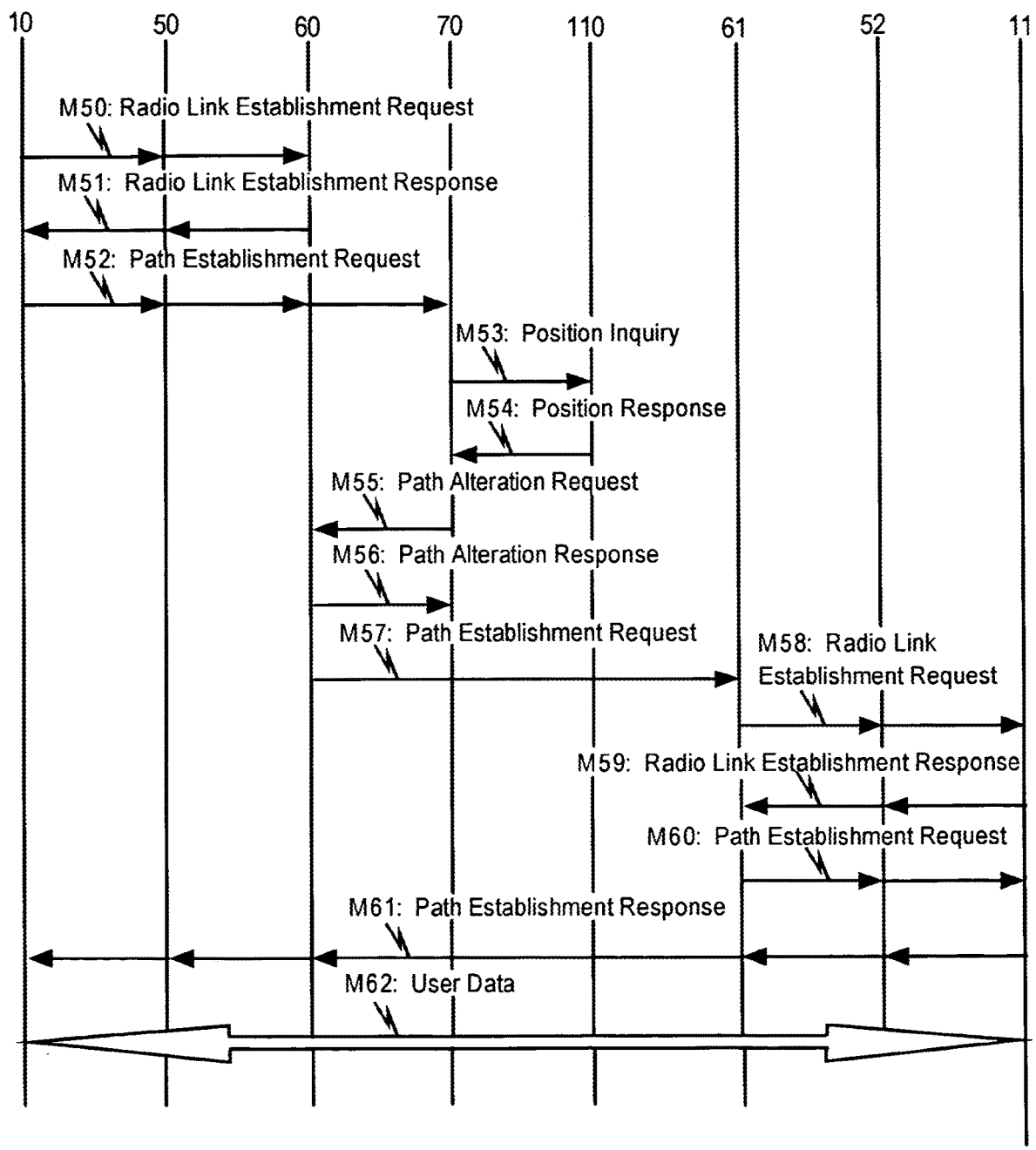
FIG. 8 is a chart of the sequence when a mobile station connects with a mobile station and establishes a packet transmission path in the second embodiment of the present invention.

Explanation next regards the second embodiment of the present invention with reference to FIG. 1 and FIGS. 8 to 11. Explanation next regards processing for establishing a packet transmission path between mobile stations in the present embodiment, taking as example the establishment of a packet transmission path between mobile station 10 and mobile station 11. FIG. 8 is a message sequence when mobile station 10 connects with mobile station 11 and establishes a packet transmission path in the present embodiment. Messages M50-M54 are similar to messages M30-M34 in FIG. 7 that was used in the explanation of the first embodiment.

Second-level packet transmission device 70, upon receiving information of the area in which mobile station 11 is located from position management server 110, investigates whether the direct transfer of packets between third-level packet transmission devices 60 and 61, which are lower-level packet transmission devices, enables a packet transmission path having link costs that are lower than a packet transmission path that passes through its own device, second-level packet transmission device 70. Then, upon learning that this type of packet transmission path can be established, second-level packet transmission device 70 transmits path alteration request message M55 to third-level packet transmission device 60, instructs the establishment of a packet transmission path that passes by way of third-level packet transmission device 61, and additionally, transfers to third-level packet transmission device 60 communication contexts that include, for example, the authentication and charge information of mobile stations 10 and 11 and that are held by second-level packet transmission device 70. Path alteration request message M55 includes communication contexts and information that indicates that the connection destination is mobile station 11 and that the packet transmission device through which the path passes is third-level packet transmission device 61.

In accordance with this message, third-level packet transmission device 60 transmits path alteration response message M56 to second-level packet transmission device 70, and then transmits to third-level packet transmission device 61 path establishment request message M57 that contains information indicating that the connection destination is mobile station 11 and that the requested service is a peer-to-peer connection. The subsequent messages M58 to M61 are equivalent to messages M36 to M39 in FIG. 7 of the explanation of the previous first embodiment. By means of these procedures, packet transmission path P2 is established between mobile station 10 and mobile station 11, and packets are transmitted and received between mobile station 10 and mobile station 11 by way of this packet transmission path P2.

At this point, an authentication operation is carried out by the procedures that are shown in FIG. 4 before the mobile station initiates communication to determine whether this mobile station is already a legitimate user, and the result of authentication and the authentication information are the authentication information for the mobile station that are held in packet transmission device 70. When packet transmission device 60, which has received the transfer of the authentication information from packet transmission device 70, receives a path establishment request or path alteration request from a user that has not yet been authenticated, packet transmission device 60 rejects the request. Packet transmission device 60, which holds the authentication information, distributes encryption keys to users that have completed authentication and performs encrypted communication in links that contain radio intervals. In addition, charge information is used for generating a charge record according to the connection time of the mobile station and the amount of packets that the mobile station has transmitted and received. The authentication function and charge function must be supported in at least one packet transmission device that is contained in a packet transmission path. To this end, when the authentication/charge functions are contained in a packet transmission device that is not included in the packet transmission path as a result of route optimization or the movement of a mobile station, these functions must be handed over to a packet transmission device in the new packet transmission path.

Figure 9:
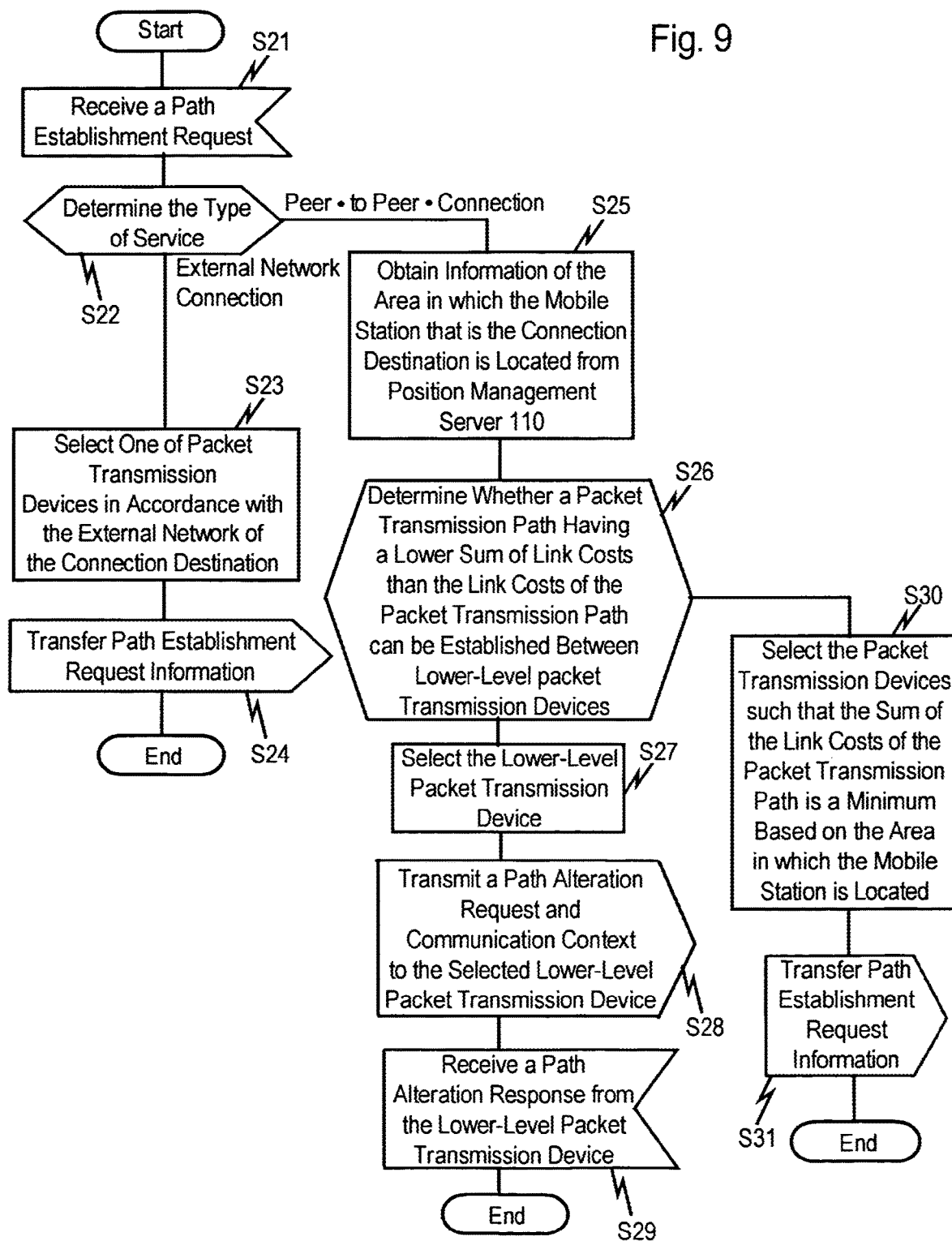
FIG. 9 is a flow chart showing the operations when a second-level packet transmission device establishes a packet transmission path in the second embodiment.

FIG. 9 is a flow chart showing the operations when second-level packet transmission devices 70, 71, and 72 establish a packet transmission path in the second embodiment. Explanation next regards the operations when second-level packet transmission devices establish a packet transmission path taking packet transmission device 70 as an example.

Second-level packet transmission device 70, upon receiving a path establishment request message from lower-level packet transmission devices 60-62 in Step S21, first determines the type of requested service in Step S22. When the requested service is an external network connection, processing is carried out in Steps S23 and S24 that is similar to Steps S13 and S14 in FIG. 6 that was used in the explanation of the first embodiment. On the other hand, when the requested service is a peer-to-peer connection, second-level packet transmission device 70 acquires information of the area in which the mobile station that is the connection destination is located from position management server 110 in Step S25, and then determines in Step S26 whether a packet transmission path having a lower sum of link costs than the link costs of the packet transmission path that passes by way of packet transmission device 70 can be established between lower-level packet transmission devices. If a packet transmission path having a lower sum of link costs can be established between the lower-level packet transmission devices, second-level packet transmission device 70 selects in Step S27 the lower-level packet transmission device to which the packet transmission path is to be changed, and in Step S28, transmits a path alteration request message to the selected lower-level packet transmission device, and further, transfers communication context information. Then, in Step S29, when a path alteration response is received from the lower-level packet transmission device, the process is completed.

The processing of Steps S30 and S31 that is carried out when a packet transmission path having a lower sum of link costs could not be established between lower-level packet transmission devices in Step S26 is equivalent to Steps S16 and S17 in FIG. 6 that was used in the explanation of the first embodiment.

In this way, a path for transferring packets between mobile station 10 and mobile station 11 was path P1 that passes by way of second-level packet transmission device 70 in the first embodiment. In the second embodiment, however, path P2 is established at a level that is equal to or lower than the level of third-level packet transmission device 60, whereby a greater optimization of the packet transmission path is achieved.

FIG. 10 shows an example of the configuration of the user authentication information table (corresponding to F122 in FIG. 2) that is managed by the second-level packet transmission device. Mobile station identifier E10 is an identifier for uniquely identifying mobile stations. Final authentication time E11 indicates the time at which authentication was last successful and is used for managing information on the time remaining until starting the next authentication procedure. Authentication status E12 indicates whether the last authentication procedure succeeded or failed. Challenge random number E13 stores a random number value that is used in the final authentication procedure. Authentication key E14 is key information for determining the success or failure of the authentication of a mobile station. Encryption algorithm E15 is used when a different encryption is used for each mobile station and holds the type of encryption algorithm such as AES (Advanced Encryption Standard) and 3DES (Triple DES). Message encryption key E16 is an encryption key that is used when actually encrypting user data. Message alteration detection key E17 is a key for detecting whether a control packet that is transmitted or received by a mobile station has been tampered with. When authentication information of mobile stations is transmitted between packet transmission devices in the second embodiment, the necessary rows are extracted from among these items of authentication information and transferred.

FIG. 11 shows an example of the configuration of a user charge information table (corresponding to F123 in FIG. 2) that is managed by a second-level packet transmission device. Mobile station identifier E20 is an identifier for uniquely identifying mobile stations. Service type E21 indicates the type of service used by a mobile station, this item taking as input "external network connection" or "peer-to-peer connection." The type of service can be further subdivided according to, for example, the provided data rate or delay time. Connection destination E22 indicates the connection destination of a mobile station and stores the identifier of a fixed network or mobile station. Uplink data transfer amount E23 and downlink data transfer amount E24 indicate in octet units the amount of data that has been transmitted or received by a mobile station in the uplink or downlink direction. Connection time E25 holds in units of seconds the time from establishing a packet transmission path until disconnection. Mobile station location network E26 indicates the network of a mobile communication business in which a mobile station is located at the time of connection, and is chiefly used for charge control when roaming on the network of a business with which the mobile station is not directly contracted. When the charge information of mobile stations is transferred between packet transmission devices in the second embodiment, the necessary rows are extracted from this charge information and transferred.

Third Embodiment

The third embodiment of the present invention will be explained below with reference to FIGS. 1, 12, 13, and 14.

Figure 12:
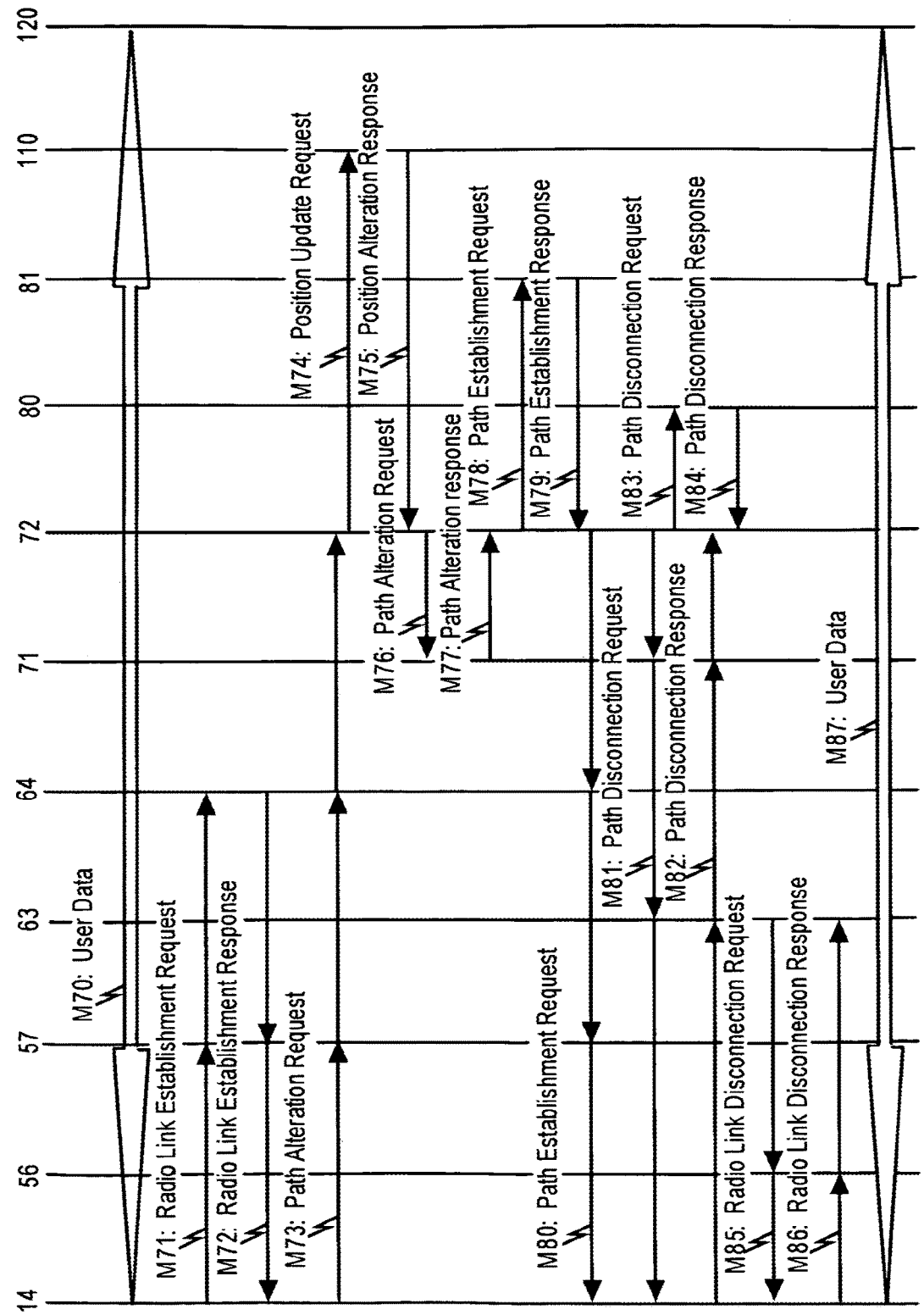
FIG. 12 is a chart of the sequence when a mobile station that is connected to a fixed network alters the packet transmission path in the third embodiment.

The following explanation regards processing when the packet transmission path is changed in accordance with the movement of a mobile station that is connected to a fixed network in the present embodiment, taking mobile station 14 as an example. FIG. 12 is a message sequence when mobile station 14 changes the packet transmission path while connected to fixed network 300. Mobile station 14 first connects to radio base station 56 by way of radio link L14 and transmits and receives packet M70 with web server 120. The packet transmission path at this time is P3 with radio base station 56, third-level packet transmission device 63, second-level packet transmission device 71, and first-level packet transmission device 80 interposed. When mobile station 14 moves into the area of radio base station 57, mobile station 14 transmits radio link establishment request M71 to radio base station 57, receives radio link establishment response M72 from radio base station 57, and establishes radio link L15. Next, when the connecting third-level packet transmission device changes from packet transmission device 63 to packet transmission device 64 with the change in radio link, mobile station 14 transmits path alteration request message M73 to packet transmission device 64. Path alteration request message M73 contains information indicating that the connection destination is fixed network 300 and that the requested service is external network connection. Third-level packet transmission device 64 transfers path alteration request message M73 to second-level packet transmission device 72. Second-level packet transmission device 72, upon receiving this message, transmits position update request message M74 to position management server 110, and updates the information of the area in which mobile station 14 is located.

Second-level packet transmission device 72 next compares packet transmission paths for connecting from mobile station 14 to fixed network 300 to determine which packet transmission path of packet transmission path P4 that passes by way of first-level packet transmission device 80 and packet transmission path P5 that passes by way of first-level packet transmission device 81 has the lower sum of link costs. In this case, if it is assumed that switching to packet transmission path P5 provides a lower sum of link costs than packet transmission path P4, path alteration request message M76 is transmitted from second-level packet transmission device 72 to second-level packet transmission device 71. In addition, when determining whether the sum of link costs is lower, a prescribed permissible range may be considered whereby, even though the sum of link costs may actually be lower, the sum of link costs is not determined to be lower if the amount of this decrease is within the permissible range.

In response to this message, second-level packet transmission device 71 transfers communication contexts such as the authentication/charge information of mobile station 14 to packet transmission device 72. Path establishment request message M78 is next transmitted from second-level packet transmission device 72 to first-level packet transmission device 81, and upon the return of the response to this message, a new packet transmission path P5 that reaches from mobile station 14 to first-level packet transmission device 81 is established. Path establishment request message M78 includes information that indicates that the connection destination is fixed network 300, and that the requested service is an external connection. Path disconnection request messages M81 and M83 are next transmitted from second-level packet transmission device 72 to packet transmission devices 80, 71, and 63 on the previous packet transmission path P3, whereby this path is disconnected. Third-level packet transmission device 63 disconnects the radio link after packet transmission path P3 has been disconnected.

In the case of the prior art, on the other hand, there is no procedure for reselecting a first-level packet transmission device, and as a consequence, there is no transmission of path establishment request M78 from second-level packet transmission device 72 to first-level packet transmission device 81 or of response message M79 from first-level packet transmission device 81 to second-level packet transmission device 72 that are shown in the sequence shown in FIG. 12, nor is there any accompanying control. In the prior art, communication continues through the already selected first-level packet transmission device 80 despite movement of mobile station 14. Thus, communication is performed using packet transmission path P4 even if, for example, packet transmission path P5 entails a lower sum of link costs than packet transmission path P4.

Figure 13:
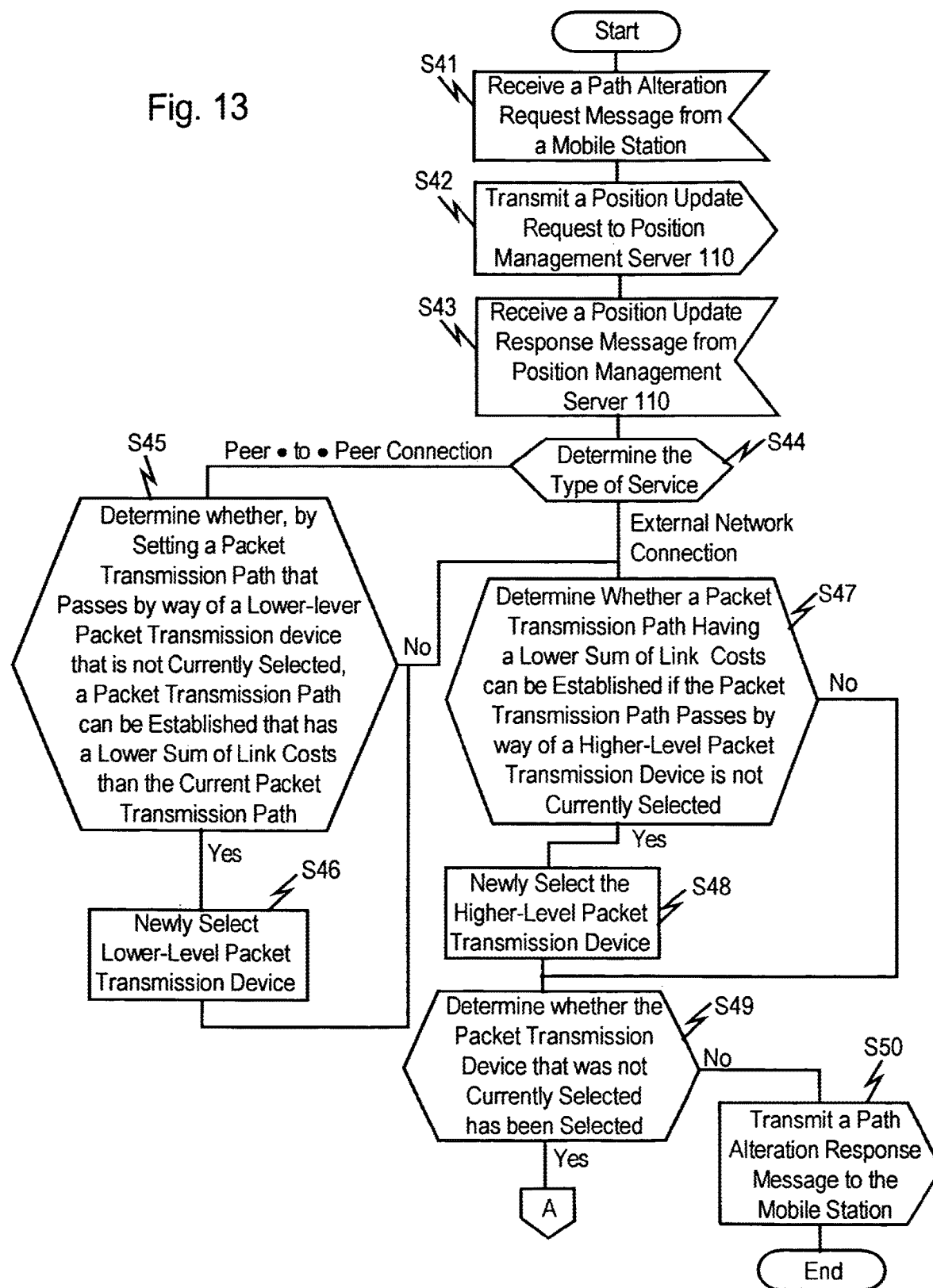
FIG. 13 is a flow chart showing the operations when a second-level packet transmission device alters the packet transmission path in the third embodiment.
Figure 14:
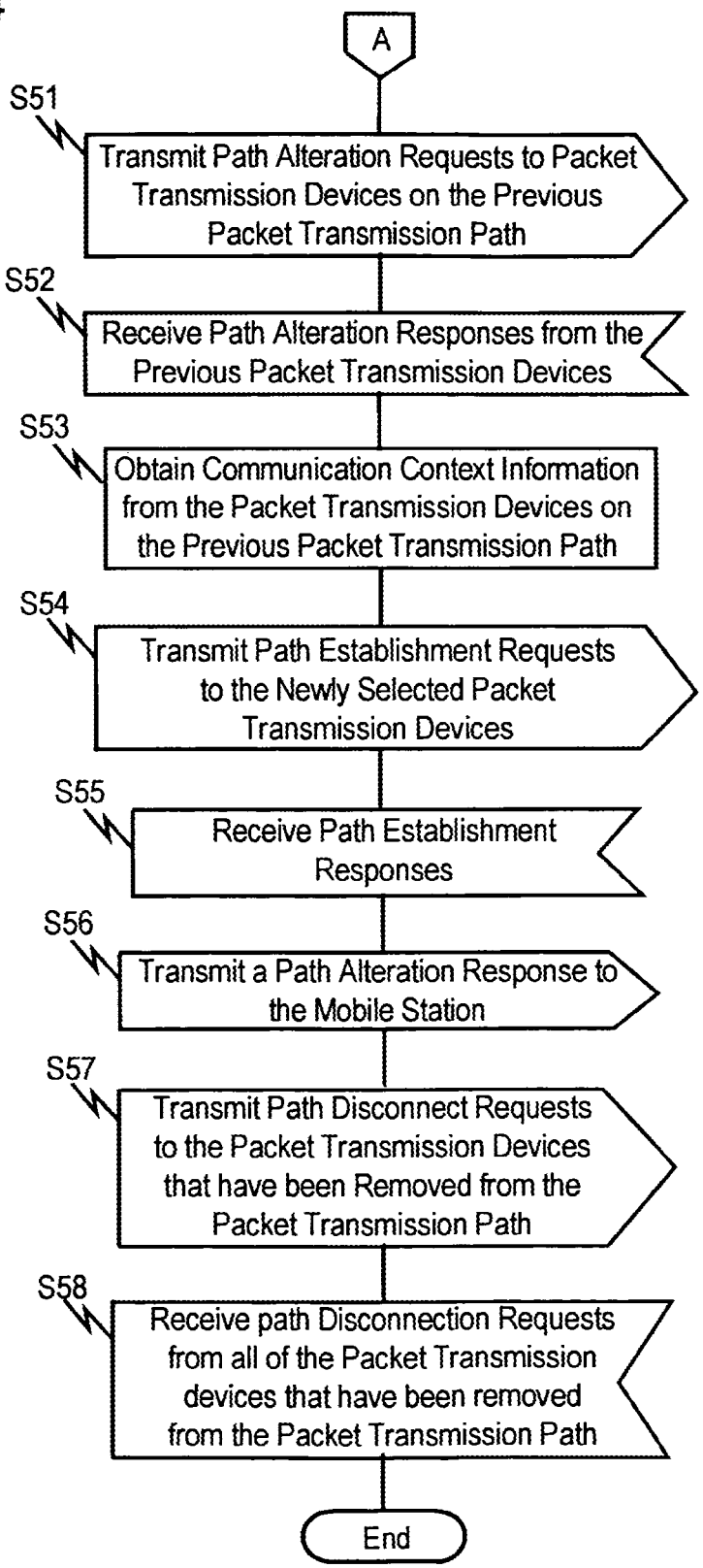
FIG. 14 is a flow chart showing the operations when a second-level packet transmission device alters the packet transmission path in the third embodiment.

FIG. 13 and FIG. 14 are flow charts illustrating the operations when second-level packet transmission devices 70-72 alter the packet transmission path in the third embodiment. Operations when a second-level packet transmission device alters the packet transmission path will be explained below taking packet transmission device 72 as an example.

Packet transmission device 72, upon receiving a path alteration request message from a mobile station in Step S41, transmits a position update request to position management server 110 and registers the new area information of the mobile station in Step S42. Upon receiving a position update response message from position management server 110 in response to this message in Step S43, packet transmission device 72 determines the type of service that is included in the path alteration request message in Step S44. If the requested service is a peer-to-peer connection, packet transmission device 72 determines in Step S45 whether, by setting a packet transmission path that passes by way of a lower-level packet transmission device that is not currently selected, a packet transmission path can be established that has a lower sum of link costs than the current packet transmission path. The state of the current packet transmission path can be understood as follows:

First, packet transmission device 72 is able to know upon the arrival at packet transmission device 72 of a path establishment request message or a path alteration request message that the originating packet transmission device and packet transmission device 72 itself are included in the packet transmission path. Further, if the requested service in the path establishment request message is a peer-to-peer connection, packet transmission device 72 can specify the packet transmission device to which the mobile station that is the connection destination belongs by inquiring to the position management server for information of the area of location of the mobile station that is the connection destination. An inquiry to the position management server is generated upon establishing a packet transmission path, but when altering an already established packet transmission path as in the present embodiment, new area information can be acquired from the packet transmission device that is the connection destination before alteration even if an inquiry is not made to position management server 110.

If a packet transmission path can be established that entails a lower sum of link costs by passing by way of lower-level packet transmission device, packet transmission device 72 newly selects lower-level packet transmission devices in Step S46 and proceeds to Step S47. If in Step S44 the service type is an external network connection, if the determination in Step S45 was "NO," or if the process was completed in Step S46, packet transmission device 72 determines in Step S47 whether a packet transmission path having a lower sum of link costs can be established if the packet transmission path passes by way of a higher-level packet transmission device that is not currently selected. If passage by way of a higher-level packet transmission device that is not currently selected allows optimization of the packet transmission path, packet transmission device 72 newly selects the higher-level packet transmission device in Step S48. Next, packet transmission device 72 determines in Step S49 whether the packet transmission device that was not currently selected has been selected. If a new selection has not been made, packet transmission device 72 simply transmits a path alteration response message to the mobile station in Step S50 and thus completes the process. In this case, the packet transmission path that was requested by the path alteration request message continues to be used without alteration.

On the other hand, when a new packet transmission device is selected, packet transmission device 72 transmits path alteration requests to packet transmission devices on the previous packet transmission path in Step S51. In response to these requests, packet transmission device 72 receives path alteration responses from the previous packet transmission devices in Step S52, whereupon packet transmission device 72 obtains communication context information from the packet transmission devices on the previous packet transmission path in Step S53. Packet transmission device 72 then transmits path establishment requests to the newly selected packet transmission devices in Step S54. In response to these requests, packet transmission device 72 receives path establishment responses in Step S55, and then transmits a path alteration response to the mobile station in Step S56. Finally, in Step S57, packet transmission device 72 transmits path disconnection requests to the packet transmission devices that have been removed from the packet transmission path. When packet transmission device 72 has received path disconnection requests from all of the packet transmission devices that have been removed from the packet transmission path in response to these requests, the process is completed.

This determination of whether the packet transmission path should be switched to pass by way of lower-level packet transmission devices or higher-level packet transmission devices when a mobile station moves allows the optimization of the packet transmission path to the packet transmission path having the lowest sum of link costs.

When switching higher-level packet transmission devices in the third embodiment, the problem may arise that change of the layer-3 address that is assigned to the mobile station may cause disconnection of the application layer connection. To explain more specifically, a mobile communication network may in some cases pool layer-3 addresses for each external network that is a connection destination in first-level packet transmission devices that serve as the gateways to external networks, and then dynamically assign layer-3 addresses in response to packet communication requests from mobile stations. This approach is adopted in, for example, current third-generation mobile communication networks (FOMA service in NTT's Dokomo) and is disclosed in JP10-013904A. In this case, when a first-level packet transmission device has been reselected so as to decrease link costs, a change also occurs in the layer-3 address. Typically, when a layer-3 address is altered during communication, communication applications that are based on TCP/IP protocol such as Web browsing, file transfer, E-mail, and stream communication are interrupted even if the applications are being executed. These problems can be avoided by either of the following two methods:

1. Using Mobile IP that is stipulated in RFC3220 of IETF, the home agent is arranged outside the mobile communication network. This approach allows the continuation of communication by using fixed HOME addresses for layer 4 and above while altering layer-3 "Care-of" addresses.

2. An operation is performed for switching higher-level packet transmission devices only for mobile stations that are not communicating data without implementing operations for switching higher-level packet transmission devices for mobile stations that have actually established radio links and that are in the process of communicating data. The instantaneous interruption of data communication that is caused by alteration of layer-3 addresses affects only mobile stations that are communicating data. Accordingly, for example, when mobile station 14 in FIG. 1 is in the process of communicating data, the communication is continued without change on packet transmission path P4. When the data communication has been completed, the path is switched to packet transmission path P5, and the next data communication is carried out using packet transmission path P5. This approach can prevent instantaneous interruptions of communication to users without resorting to the previously described Mobile IP.

Although the preceding explanation regards embodiments of the present invention, the present invention is not limited only to the above-described embodiments, but various additions and modifications can be made. In addition, the functions possessed by the packet transmission device of the present invention may of course be implemented by hardware, or can be implemented by a computer and a program for a packet transmission device. A packet transmission device program may be provided by recording on a recording medium that can be read by a computer such as a magnetic disk or semiconductor memory, may be read into a computer upon start-up of the computer, and may then cause the computer to function as the packet transmission device in each of the previously described embodiments by controlling the operations of the computer.

The invention claimed is:

1. A Serving General Packet Radio Service Support Node (SGSN) in a mobile communication network including a mobile station and a first network node, the SGSN comprising:
    at least one processor; and
    at least one memory coupled to the at least one processor, the memory storing instructions that when executed by the at least one processor cause the at least one processor to:
        receive, from the mobile station, a Packet Data Protocol (PDP) Context Activation message including type information that is not a name or an address of a node that is to be connected, the type information comprising either:
            a first type indicating that the mobile station requests a first connection or a second type indicating that the mobile station requests a second connection,
        employ a selection method that selects the first network node based on an Access Point Name (APN),
        determine whether the type information indicates the first type or the second type, and
        transfer at least part of the PDP Context Activation message to the first network node using the selection method, when the SGSN determines that the type information indicates the first type.

2. The SGSN according to claim 1, wherein the SGSN transfers the part of the PDP Context Activation message to a second network node not using the selection method, when the SGSN determines that the type information indicates the second type.

3. The SGSN according to claim 1, wherein the first network node connects to an external network.

4. A method for a Serving General Packet Radio Service Support Node (SGSN) in a mobile communication network including a mobile station and a first network node, the method comprising:
- receiving, from the mobile station, a Packet Data Protocol (PDP) Context Activation message including type information that is not a name or an address of a node that is to be connected, the type information comprising either:
  - a first type indicating that the mobile station requests a first connection or a second type indicating that the mobile station requests a second connection;
- employing a selection method that selects the first network node based on an Access Point Name (APN);
- determining whether the type information indicates the first type or the second type; and
- transferring at least part of the PDP Context Activation message to the first network node using the selection method, when the SGSN determines that the type information indicates the first type.

5. The method according to claim 4, wherein the SGSN transfers the part of the PDP Context Activation message to a second network node not using the selection method, when the SGSN determines that the type information indicates the second type.

6. The method according to claim 4, wherein the first network node connects to an external network.

7. A mobile station in a mobile communication network including a Serving General Packet Radio Service Support Node (SGSN) and a first network node, the mobile station comprising:
- at least one processor; and
- at least one memory coupled to the at least one processor, the memory storing instructions that when executed by the at least one processor cause the at least one processor to:
  - store type information that is not a name or an address of a node that is to be connected, the type information comprising either:
    - a first type indicating that the mobile station requests a first connection or a second type indicating that the mobile station requests a second connection,
  - send a Packet Data Protocol (PDP) Context Activation message including the type information to the SGSN that determines whether the type information indicates the first type or the second type, and
  - receive a response message from the first network node that is selected by the SGSN based on an Access Point Name (APN), when the SGSN determines that the type information indicates the first type.

8. The mobile station according to claim 7, wherein the SGSN transfers a part of the PDP Context Activation message to a second network node, when the SGSN determines that the type information indicates the second type.

9. The mobile station according to claim 7, wherein the first network node connects to an external network.

10. A method for a mobile station in a mobile communication network including a Serving General Packet Radio Service Support Node (SGSN) and a first network node, the method comprising:
- storing type information that is not a name or an address of a node that is to be connected, the type information comprising either:
  - a first type indicating that the mobile station requests a first connection or a second type indicating that the mobile station requests a second connection;
- sending a Packet Data Protocol (PDP) Context Activation message including the type information to the SGSN that determines whether the type information indicates the first type or the second type; and
- receiving a response message from the first network node that is selected by the SGSN based on an Access Point Name (APN) when the SGSN determines that the type information indicates the first type.

11. The method according to claim 10, wherein the SGSN transfers a part of the PDP Context Activation message to a second network node, when the SGSN determines that the type information indicates the second type.

12. The method according to claim 10, wherein the first network node connects to an external network.

* * * * *